US012628726B2

(12) United States Patent
Copetti et al.

(10) Patent No.: US 12,628,726 B2
(45) Date of Patent: May 19, 2026

(54) SPACING ADJUSTMENT MECHANISM OF THE DEPTH GAUGE WHEELS ASSEMBLY, PLANTING ROW UNIT AND AGRICULTURAL IMPLEMENT

(71) Applicant: CNH Industrial America LLC, New Holland, PA (US)

(72) Inventors: Eduardo Copetti, Piracicaba (BR); Regis Carlos Pereira da Silva, Dobrada (BR)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 501 days.

(21) Appl. No.: 17/841,814

(22) Filed: Jun. 16, 2022

(65) Prior Publication Data

US 2022/0400604 A1 Dec. 22, 2022

(30) Foreign Application Priority Data

Jun. 20, 2021 (BR) .......................... 1020210121912

(51) Int. Cl.
*A01C 7/20* (2006.01)
*A01B 61/04* (2006.01)
*A01B 63/00* (2006.01)

(52) U.S. Cl.
CPC .............. *A01C 7/201* (2013.01); *A01B 61/04* (2013.01); *A01B 63/004* (2013.01)

(58) Field of Classification Search
CPC ....... A01C 7/201; A01B 61/04; A01B 63/002; A01B 63/004
See application file for complete search history.

(56) References Cited

U.S. PATENT DOCUMENTS

| | | | | |
|---|---|---|---|---|
| 4,336,846 A * | 6/1982 | Boetto | ................. | A01B 73/044 |
| | | | | 172/776 |
| 5,427,038 A * | 6/1995 | Ege | ........................ | A01C 5/064 |
| | | | | 111/164 |
| 5,904,107 A * | 5/1999 | Kester | ...................... | A01C 5/06 |
| | | | | 111/135 |
| 6,321,667 B1 * | 11/2001 | Shoup | .................... | A01C 5/068 |
| | | | | 111/164 |
| 2004/0251037 A1 * | 12/2004 | Templeton | ............. | A01G 3/062 |
| | | | | 172/123 |
| 2011/0107949 A1 * | 5/2011 | Schilling | ................ | A01C 5/068 |
| | | | | 111/163 |
| 2011/0113997 A1 * | 5/2011 | Schilling et al. | ...... | A01C 7/203 |
| | | | | 111/163 |
| 2015/0271980 A1 * | 10/2015 | Steinlage et al. | ...... | A01B 15/16 |
| | | | | 172/604 |
| 2017/0303464 A1 * | 10/2017 | Sivinski et al. | ........ | A01C 5/064 |
| 2020/0178457 A1 * | 6/2020 | Sivinski | ................. | A01C 5/064 |
| 2021/0289688 A1 * | 9/2021 | Sivinski | ................. | A01C 7/203 |

FOREIGN PATENT DOCUMENTS

RU 2173417 C1 * 9/2001

* cited by examiner

*Primary Examiner* — Tara Mayo
(74) *Attorney, Agent, or Firm* — Fletcher Yoder, P.C.

(57) ABSTRACT

A spacing adjustment mechanism of a depth gauge wheel assembly of a planting row unit of an agricultural implement includes a rod fixed on one side to a pivot assembly of the planting row unit, and on which a spindle with a threaded external face is mounted, the threaded external face interacts with a threaded inner face of a bearing of a support arm of a gauge wheel.

10 Claims, 5 Drawing Sheets

SPACING ADJUSTMENT MECHANISM OF THE DEPTH GAUGE WHEELS ASSEMBLY, PLANTING ROW UNIT AND AGRICULTURAL IMPLEMENT

CROSS-REFERENCE TO RELATED APPLICATION

This application claims priority from and the benefit of BR application No. 1020210121912, entitled "SPACING ADJUSTMENT MECHANISM OF THE DEPTH GAUGE WHEELS ASSEMBLY, PLANTING ROW UNIT AND AGRICULTURAL IMPLEMENT", filed Jun. 20, 2021, which is hereby incorporated by reference in its entirety.

FIELD OF INVENTION

The present invention refers, in general, to a new mechanism for adjusting the assembly of depth gauge wheel of the planting row units of agricultural implements, such as the so-called planters and seeders. More particularly, this adjustment mechanism comprises technical, constructive and functional features designed and developed to promote the adjustment of the spacing between the gauge adjusting wheels in a simple, fast and efficient way, optimizing the time and procedures adopted for this type of adjustment.

The present invention also refers to a new planting row unit for agricultural implements, which is equipped with this adjustment mechanism for gauge adjusting wheels. Also, the invention refers to a new agricultural implement, which comprises planting row units containing said adjustment mechanism of the assembly of depth gauge wheels.

BACKGROUND OF THE INVENTION

Several models of agricultural implements are known in the state of the art, for example planters and seeders that are used for the distribution of seeds, fertilizers, herbicides, pesticides and fungicides on the planting rows in the field. As must be appreciated by a person skilled in the art, these models of agricultural implements can be self-propelled or not, and in the latter case, they are towed by a work vehicle, for example, a tractor.

Usually, these implements have a rigid structural chassis that is mounted on wheels installed at strategic points to allow their displacement, and this structural chassis also supports, a plurality of planting row units which are installed longitudinally along the entire length of said structural frame, with each planting row unit responsible for cutting the straw, opening a furrow in the soil, applying manure/fertilizers, depositing the seeds at a desired depth, covering the furrow and compacting the soil. Normally, these implements also comprise silos and tanks intended for the storage of seeds, fertilizers, herbicides, pesticides and fungicides, which end up being supported by the aforementioned structural chassis.

More particularly, these planting row units are configured to deposit seeds and apply other products to a desired depth below the surface of the soil, thereby establishing rows of planted seeds. By way of example, it is known that each planting row unit may include sets of opening discs which are intended to open a furrow in the soil to deposit seeds and other agricultural products, and these sets of opening discs may include gauge wheels that are able to control the penetration depth of these opening discs in the ground.

Currently, depending on the type of seed, said opening discs are adjusted by varying the opening angle between them, requiring the depth gauge wheels to be adjusted to, in some way, follow the spacing and positioning of said opening discs. Moreover, depending on the type of planting, there may be a need to adjust the distance between the depth gauge wheel and the cutting discs, so that it is possible to have an adequate space for the proper drainage of straw, mud and debris disposed in the planting area. Therefore, according to the technologies available in the state of the art, the adjustment of the spacing between the depth gauge wheels is normally performed by inserting or removing spacers along the rod that couples the gauge wheel arm to the frame of the planting row unit. FIGS. 3A and 3B show an example of how this type of adjustment is performed using spacers according to the state of the art. As can be seen by a person skilled in the art, it is necessary to disassemble the nuts and bolts, then release the support arms from the gauge wheels, and then insert or remove the spacer elements according to the desired spacing. After positioning the spacer elements, it is necessary to reposition the support arms of the gauge wheels and, finally, secure the nuts and bolts.

Usually, each planting row unit comprises two depth gauge wheels and, therefore, this entire procedure of adjusting the space between the depth adjusting wheels needs to be carried out in duplicate for each planting row unit. The complexity is even greater, considering that agricultural implements comprise a large number of units of planting rows, making it something significantly time-consuming, in addition to requiring specialized labor, which certainly ends up directly affecting the productivity of the planting process. Also, it must be appreciated by the person skilled in the art, that when there is not the proper spacing adjustment between the discs, the "bushing" and/or accumulation of mud and debris can require constant equipment stops, directly affecting the availability of the machine and the productivity of the work performed.

Thus, as can be seen, agricultural implements, such as the planter and seeder type, known in the state of the art, lack a practical, functional, and especially efficient solution, which makes it possible to adjust the spacing between the depth-gauge wheels in agile and efficient way, but mainly without the need to disassembly and remove the gauge wheel support arms, thus optimizing the time and resources used in carrying out these tasks.

Thus, it is verified that the proposals known in the state of the art to adjust the spacing of the depth gauge wheels of the planting row units are not practical and efficient, and may compromise the work operations of these agricultural implements that, in the end, end up affecting the productivity of activities and the interests of farmers. Therefore, these are, among others, the inconveniences and limitations that are intended to be solved with the development of the present invention.

DESCRIPTION OF THE INVENTION

Thus, according to the above, an objective of the present invention is provide a new adjustment mechanism for the assembly of depth gauge wheels of a planting row unit for agricultural implements, particularly those intended for the distribution of seeds, manures, fertilizers, herbicides, pesticides and fungicides in the field, such as planters and seeders, this new adjustment mechanism was designed and developed to obtain a practical, functional and efficient solution to the problems, limitations and drawbacks disclosed in the state of the art, as summarized above.

More particularly, it is one of the objectives of the present invention to provide a new adjustment mechanism for the assembly of depth gauge wheels of a planting row unit for an agricultural implement that comprises technical, constructive and functional tools capable of significantly simplifying and speeding up the procedure for adjusting the spacing between the gauge wheels depth, in order to improve and increase the productivity of work in the field.

Also, it is an object of the present invention to provide a planting row unit, such as those intended for the distribution of seeds, manures, fertilizers, herbicides, pesticides and fungicides in the field, which comprises a spacing adjustment mechanism of the assembly of gauge wheels depth, as mentioned above.

Furthermore, the present invention relates to an agricultural implement, such as a planter, seeder, fertilizer spreader or a sprayer, which comprises planting row units provided with said adjustment spacing mechanism of the gauge wheels assembly, as discussed above.

Thus, in order to achieve the technical and functional improvements summarized above, among others, the present invention refers to a new spacing adjusting mechanism of the depth gauge wheel assembly, which is essentially formed by a rod fixed on one side to a pivot assembly of the planting row unit, and on which a spindle with an external threaded face is mounted that interacts with the internal threaded face of a bearing of the support arm of the gauge wheel.

According to one embodiment of the present invention, said spindle may comprise, at the opposite end of the pivot assembly, a hexagonal head.

Still, according to a further embodiment of the present invention, the threaded outer face of said spindle and the threaded inner face of said bearing may comprise a thread of the trapezoidal, triangular, round, square or sawtooth type.

In another possible embodiment of the present invention, said spindle can be manufactured in a self-lubricating material, such as an ultra-high density material with fiberglass and graphite, with a very low coefficient of friction and zero or close to zero moisture absorption.

According to another embodiment of the present invention, the adjustment mechanism may further comprise a washer cooperating with a snap ring, which are configured to stop the longitudinal displacement of said spindle with respect to said rod. Optionally, this washer can be made of a stainless material with a low coefficient of friction.

Additionally, the present invention refers to a planting row unit, which is configured to promote the distribution of seeds, fertilizers, manure, herbicides, pesticides and fungicides in the field, this planting row unit being formed by a structure that supports at least one opening disc and a regulating wheel, being also provided with a spacing adjustment mechanism as mentioned above. According to a particular embodiment of the present invention, the planting row unit may comprise two opening discs and two gauge wheels.

Finally, the present invention also refers to an agricultural implement that comprises a structural chassis supported by at least one assembly of wheels and also has toolbars on which several planting row units are installed, and this implement agriculture comprises at least one planting row unit whose depth gauge wheels are associated with the spacing adjustment mechanisms as defined and commented above.

BRIEF DESCRIPTION OF DRAWINGS

The features, advantages and functional improvements of the present invention, as indicated above, will be better understood by a person skilled in the art from the following detailed description, made by way of example only, and not restrictive, of possible embodiments, and with reference to the attached drawings, which.

DESCRIPTION OF THE EMBODIMENTS OF THE INVENTION

The invention will now be described with reference to its exemplary embodiments, and with reference to the attached drawings. Such figures are schematic, and their dimensions and/or proportions may not correspond to reality, since they aim to describe the present invention in a didactic way. Furthermore, certain known and common constructive details may have been omitted for greater clarity and conciseness of the description that follows. Reference numbers used are repeated throughout the figures to identify identical or similar parts. The terms eventually used such as "above", "below", "front", "back", "right", "left" etc., and its variants must be interpreted according to the guidance given in FIG. 1.

Figure 1:
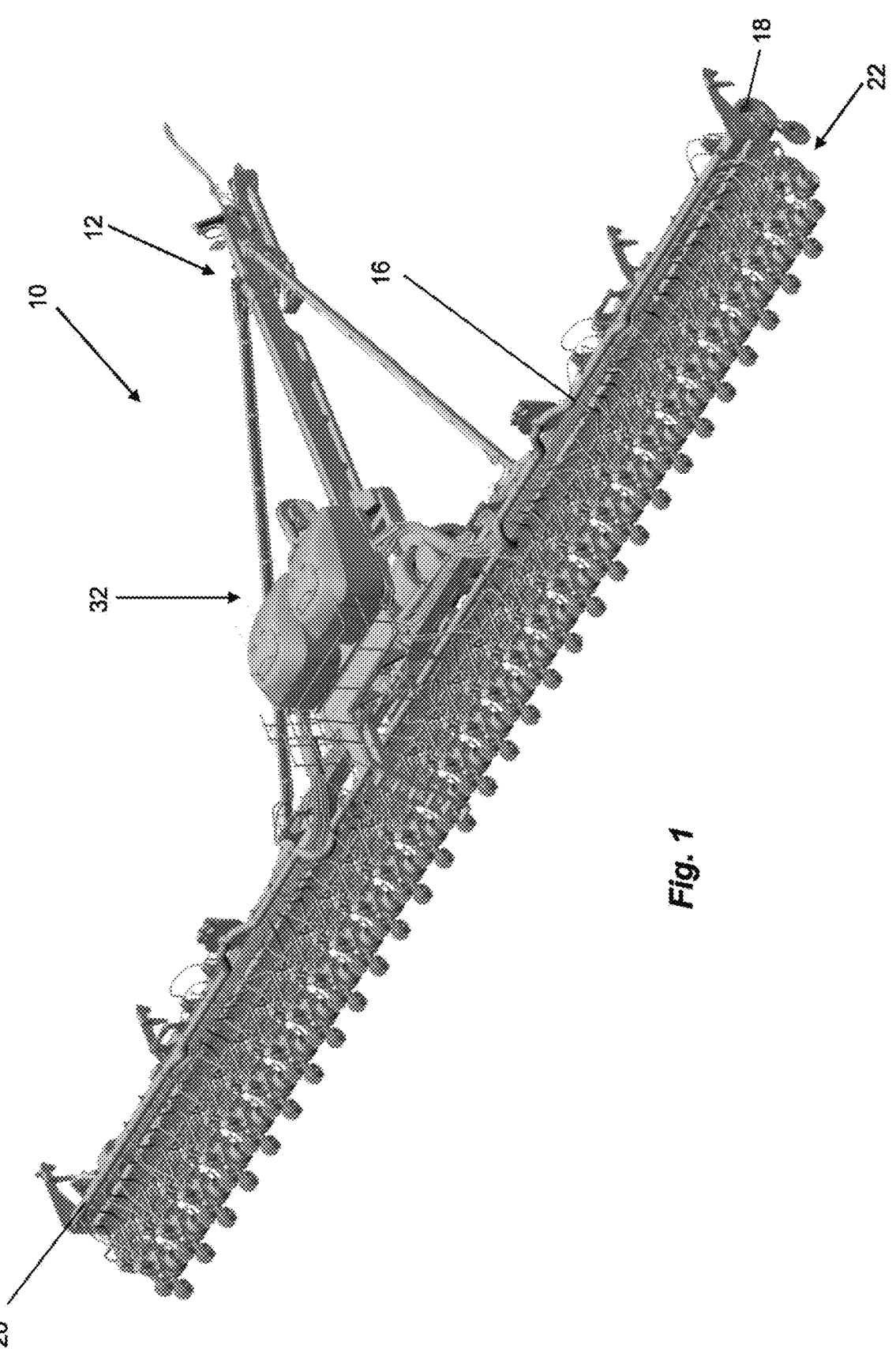
FIG. 1 shows a schematic perspective view of an agricultural implement model, such as a planter or seeder.

Now, with reference to the attached drawings and, more specifically to FIG. 1, an agricultural implement 10 is represented used in the distribution of seeds, manures, fertilizers, herbicides, pesticides and fungicides on the planting rows in the field, such as the so-called planters and seeders, which are configured to be towed across the field by a work vehicle, for example a tractor. As will be appreciated by those skilled in the art, these agricultural implement models 10 are formed by a tongue bar 12 designed to, on the one side, couple the work vehicle, and on the other side, support the structural chassis 16 which is mounted on at least one assembly of wheel 18 and also has toolbars 20 on which several planting row units 22 are installed. Said agricultural implement 10 also comprises silos or tanks 32 intended for the storage of seeds and/or manure/fertilizer and are usually positioned in the central portion of the structural chassis 16.

Figure 2:
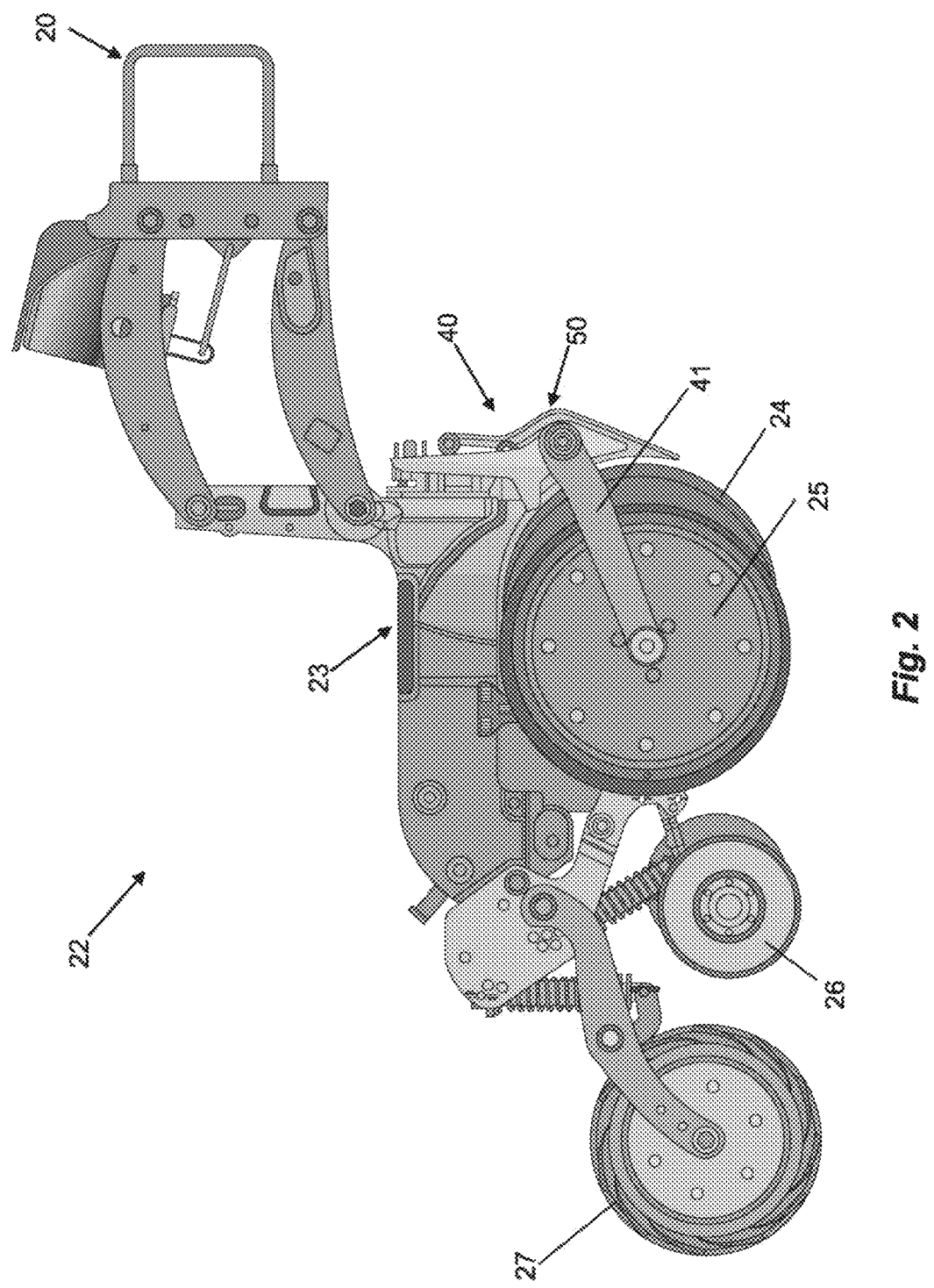
FIG. 2 shows a schematic side view of a planting row unit for an agricultural implement as shown in FIG. 1.

Each planting row unit 22, as can be seen in FIG. 2, may include a fitting frame, one or more opening discs 24 configured to form a seed furrow in the soil, the penetration depth of these opening discs 24 is adjusted and controlled by means of the depth gauge wheels 25. Further, the planting row unit 22 may include an agricultural product delivery system (e.g. seed tubes or motorized agricultural produce dispensers) configured to deposit seeds and/or other agricultural products (e.g. manure, fertilizers, herbicides, pesticides and fungicides) in the seed furrow formed in the ground. In addition, the row unit 22 may include cover disc(s) 26 and/or a packer wheel 27 positioned at the rear of the planting row unit 22. As will also be appreciated by those skilled in the art, the cover discs 26 are configured to move the displaced soil back into the seed furrow, and the packer wheel 27 is configured to firm the soil and provide better contact conditions between the seeds and the soil.

An agricultural implement 10 as described herein may be, by way of reference, a planter model produced by CNH Industrial, commercialized under the brands Case IH and New Holland.

The terms referred to herein as agricultural implement, planter, seeder and their variants are used interchangeably to designate equipment or a machine designed and configured to promote the distribution of seeds, manure, fertilizers, herbicides, pesticides and fungicides in the ground.

Figure 3A:
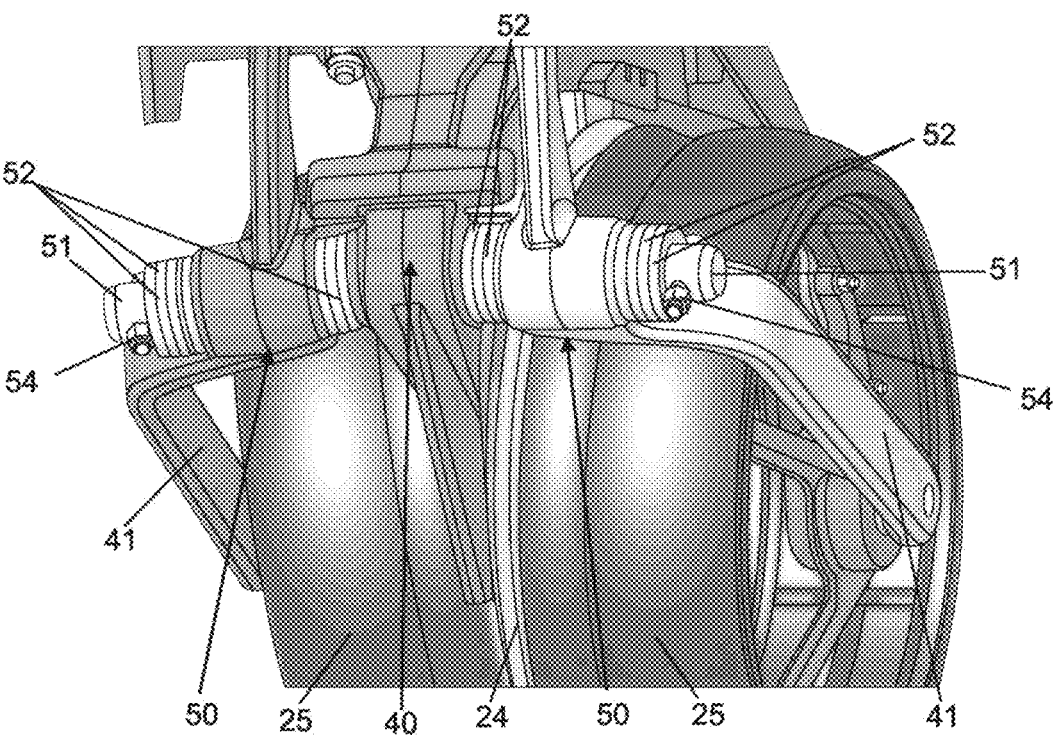
FIGS. 3A and 3B show perspective and rear sectional views, respectively, of a model of a spacing adjustment mechanism of the depth gauge wheel assembly known in the state of the art.
Figure 3B:
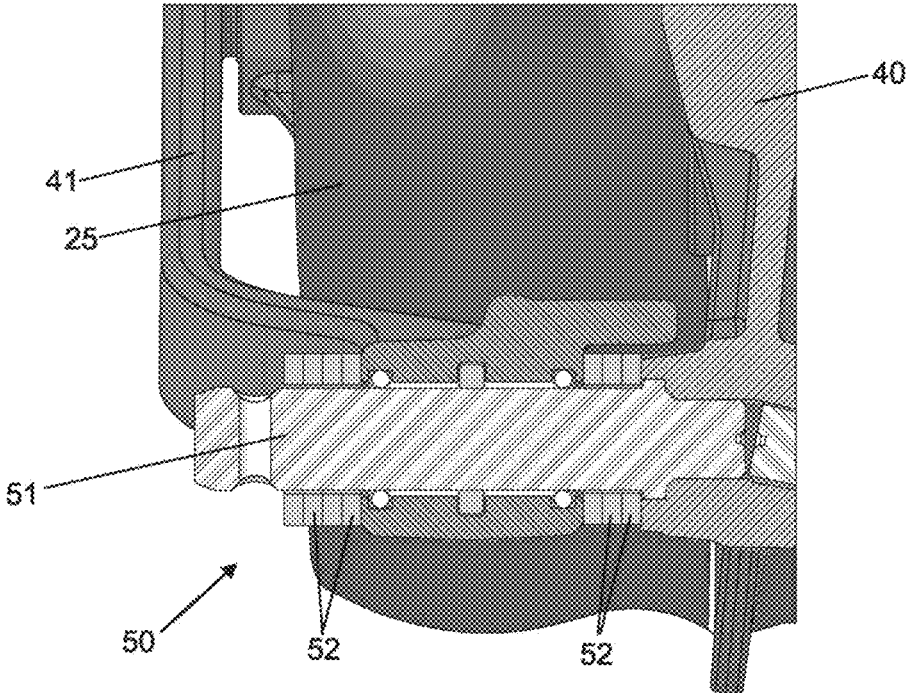
Figure 4A:
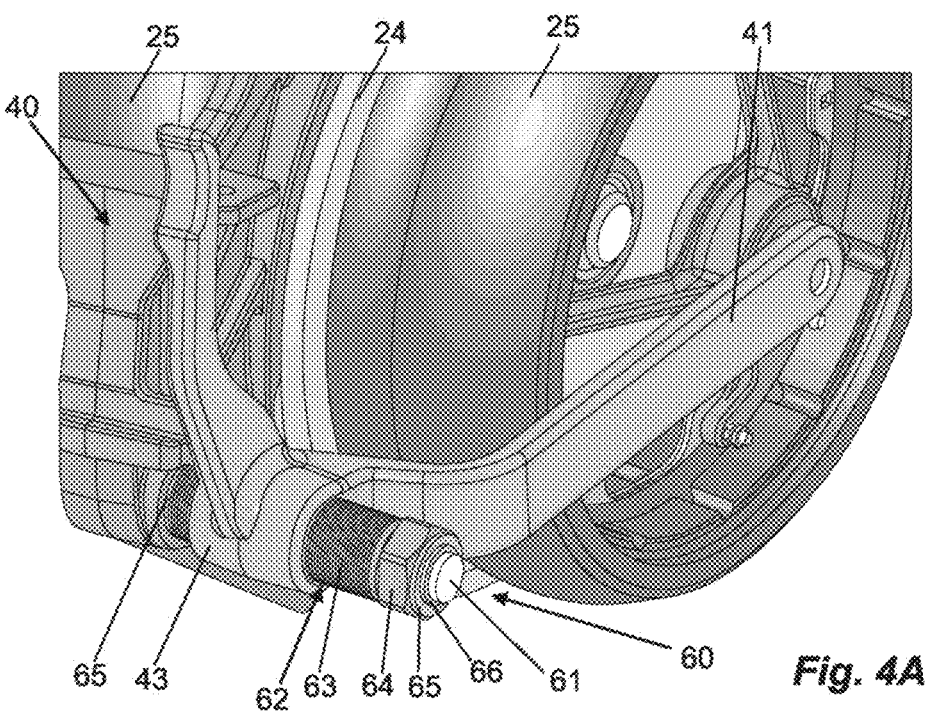
FIGS. 4A and 4B show perspective and rear sectional views, respectively, of the spacing mechanism of the depth gauge wheel assembly, in accordance with one embodiment of the present invention.
Figure 4B:
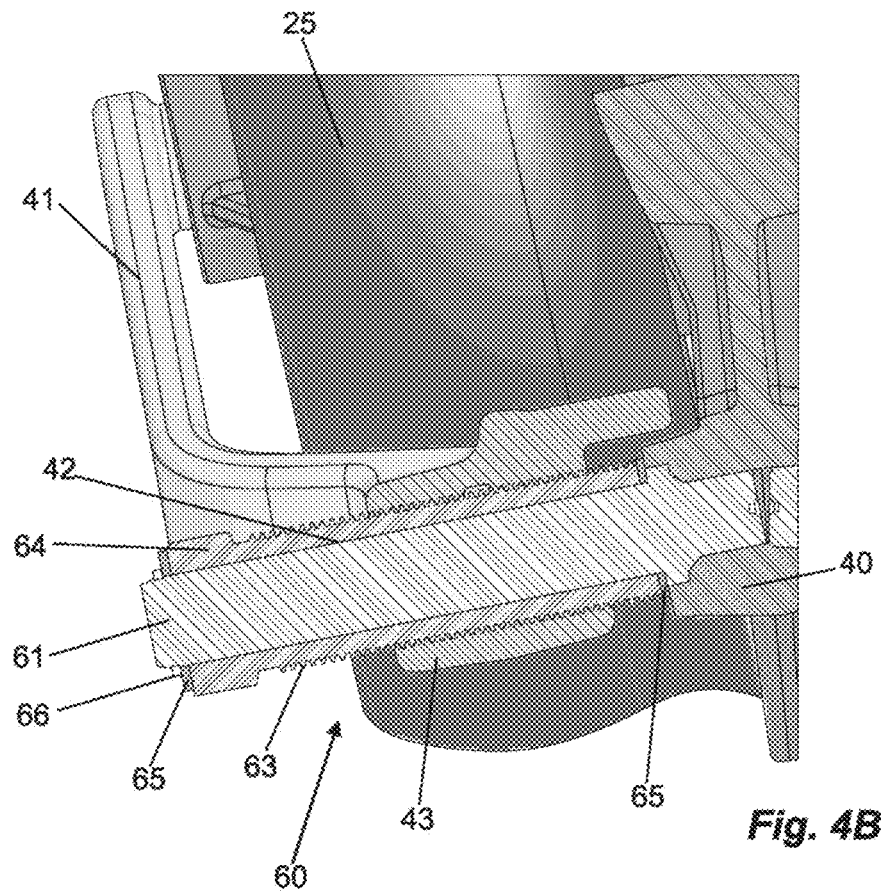
Figure 5:
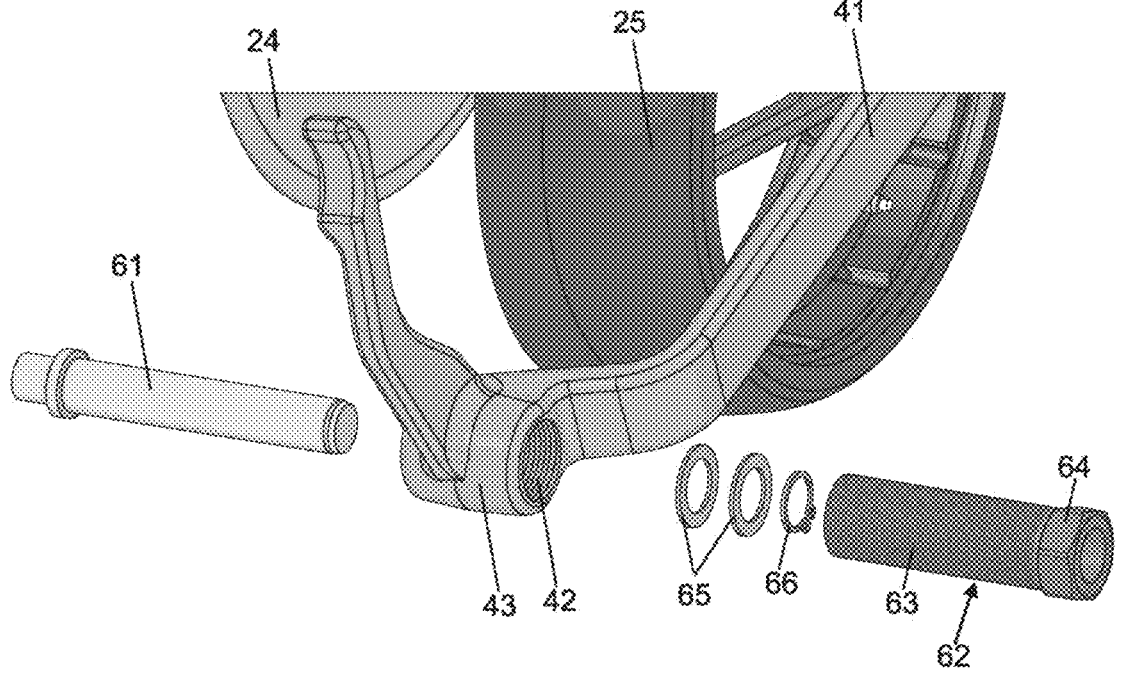
FIG. 5 shows an exploded view of the spacing mechanism of the depth gauge wheel assembly in accordance with one embodiment of the present invention.

By way of context, and as mentioned above, FIGS. 3A and 3B show embodiments of the state-of-the-art in which gauge wheels 25 are coupled to a planting row unit 22 through a pivot assembly 40 which comprises an spacing adjustment mechanism 50 to adjust the distance between the depth gauge wheels 25 that are assembled on support arms 41 responsible for performing the pivot movement with the pivot assembly 40 to provide the adjustment of the penetration depth of the opening discs 24 in the ground. More particularly, as can be seen, the spacing adjustment mechanism 50 is formed by a rod 51 on which the support arm 41 of the depth gauge wheel 25 is mounted, whereby the spacing adjustment between the gauge wheels 25 is, in this way, carried out by positioning spacer elements 52 along said rod 51, thereby providing for the increase and reduction of the distance between the support arms 41 and, consequently, the space between the gauge wheels 25. To perform this adjustment procedure, the operator removes the bolt nut 54, removes the support arm 41 which can weigh about 13 kg, removes or adds spacer elements 52 depending on the desired configuration, and then attaches the support arm 41 back to the pivot assembly 40 and retighten the bolt nut 54. As can be seen by a person skilled in the art, in addition to requiring a specialized professional for this procedure, it takes time and special tools to perform this type of work.

Thus, in view of the context presented above, and with reference to the other attached schematic drawings, it is possible to verify that the spacing adjustment mechanism 60 for a planting row unit 22, according to the present invention, is formed by a rod 61 having an end fixed to the pivot assembly 40, and on which a spindle 62 is mounted which comprises an external threaded face 63 which interacts with an internal threaded face 42 of a bearing 43 of the support arm 41, said spindle 62 being able to be rotated, causing the bearing 43 to move laterally on the spindle 62 and, consequently, causing the displacement of the support arm 41, and changing the space between the gauge wheels 25. In other words, according to the present invention, as said bearing 43 of support arm 41 moves in the opposite direction to pivot assembly 40, the distance between gauge wheels 25 increases and, as said bearing 43 of support arm 41 moves towards pivot assembly 40, the distance between gauge wheels 25 decreases.

According to a particular embodiment of the present invention, the spindle 62 may comprise, at the opposite end of the pivot assembly 40, a hexagonal head 64, or any other means that facilitates the manipulation and rotation of said spindle 62 to thereby promote the desired distance.

Also, according to another embodiment of said adjustment mechanism 60, the threaded external face 63 of said spindle 62 and the threaded internal face 42 of the bearing 43 can comprise a trapezoidal type thread, which can offer better conditions of interaction and precision in the movement of the bearing 43 on said spindle 62. Optionally, this thread can also comprise a triangular, round, square or sawtooth profile setting.

According to another embodiment of the present invention, said spindle 62 can be made from a self-lubricating material, such as an ultra-high density material with fiberglass and graphite, and which comprises a very low coefficient of friction, in addition to reduced ability to absorb moisture, as these equipment are operated in environments that may present aggressive and corrosive elements to the components of this equipment. It is worth mentioning that, must be known to the person skilled in the art, the hydroscopic degree of the material used in the manufacture of the spindle 62 is an aspect of great importance in terms of durability, since the component will be directly applied in environments with significant level of humidity.

In addition, according to another embodiment of said spacing adjustment mechanism 60, object of the present invention, it is possible to have washers 65 that work together with at least one pressure ring 66 to assist in positioning and longitudinally locking said spindle 62 together with rod 61. Furthermore, it must be clear that this assembly guarantees longitudinal locking of the spindle 62, but does not affect the ability of said spindle 62 to rotate freely on the rod 61. According to a particular embodiment, said washer 65 may be a washer made of stainless material with a low coefficient of friction.

Therefore, it appears that the new proposal for the spacing adjustment mechanism 60 of the gauge wheels assembly 25 for planting row units 22 for agricultural implements 10, according to the present invention, manages to improve the working conditions of these equipment, but mainly, drastically reducing the time and resources needed to carry out the adjustment of the distance between the gauge wheels 25, excluding the need to disassemble any part of the planting row unit and, with that, increasing the work productivity during the actual warehouse work. of seeds and/or application of manures, fertilizers, herbicides, pesticides and fungicides on the planting rows in the field.

Additionally, as mentioned above, the present invention refers to a planting row unit 22, such as those intended for the distribution of seeds, manures, fertilizers, herbicides, pesticides and fungicides in the field, which comprises at least one depth gauge wheel 25 associated with a spacing adjustment mechanism 60 as defined above.

According to a particular embodiment of the present invention, said planting row unit 22 comprises two opening discs 24 and two gauge wheels 25.

Additionally, as mentioned above, the present invention also relates to an agricultural implement 10, which comprises a structural chassis 16 that is supported by at least one assembly of wheels 18 and also has toolbars 20 on which several planting row units 22 are installed, and the depth gauge wheels 25 are associated with spacing adjustment mechanisms 60, as defined and presented above.

According to possible embodiments of the present invention, said agricultural implement 10 can be a planter, seeder, fertilizer spreader or a sprayer.

Finally, considering all of the above, it is important to note that the present description aims only to present and define, in an exemplary way, particular embodiments of the new spacing adjustment mechanism 60 of the gauge wheels assembly 25 for a planting row unit 22 of agricultural implements 10, according to the present invention. Therefore, as a person skilled in the art should appreciate, several modifications and combinations of elements and equivalent details are possible without, therefore, deviating from the scope of protection defined by the attached claims.

The invention claimed is:

1. A spacing adjustment mechanism of a depth gauge wheel assembly of a planting row unit of an agricultural implement, comprising:

a rod fixed on one side to a pivot assembly of the planting row unit, and on which a spindle is mounted, the spindle is provided with a threaded external face that interacts with a threaded inner face of a bearing of a support arm of a gauge wheel;

a pressure ring; and a washer, wherein the washer and the pressure ring are configured to cooperate to lock a longitudinal displacement of the spindle along the rod while enabling the spindle to rotate on the rod.

2. The spacing adjustment mechanism, according to claim 1, wherein the spindle comprises, at an opposite end to the pivot assembly, a hexagonal head.

3. The spacing adjustment mechanism, according to claim 1, wherein each of the threaded external face of the spindle and the threaded inner face of the bearing comprises a thread of a trapezoidal, triangular, round, square, or sawtooth type.

4. The spacing adjustment mechanism, according to claim 1, wherein the spindle is made of a self-lubricating material.

5. The spacing adjustment mechanism, according to claim 4, wherein the self-lubricating material comprises a material with fiberglass and graphite.

6. The spacing adjustment mechanism, according to claim 1, wherein the washer is made of stainless material.

7. A planting row unit configured for the distribution of seeds, fertilizers, herbicides, pesticides, or fungicides in the ground, wherein the planting row unit comprises a structure that supports at least one opening disc and the gauge wheel, wherein the planting row unit comprises the spacing adjustment mechanism as defined in claim 1.

8. The planting row unit, according to claim 7, wherein the at least one opening disc comprises two opening discs, and the planting row unit comprises a second gauge wheel.

9. An agricultural implement, which comprises a structural chassis supported by at least one assembly of wheels and comprising toolbars on which several planting row units are installed, and the agricultural implement comprises at least one planting row unit having the gauge wheel associated with the spacing adjustment mechanism as defined in claim 1.

10. The agricultural implement, according to claim 9, wherein the agricultural implement is a planter, seeder, fertilizer spreader, or sprayer.

* * * * *